Figure 1:
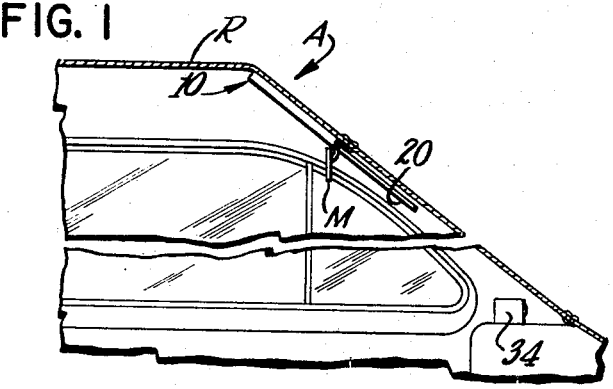

Sept. 26, 1967  A. K. MANOOKIAN, JR  3,343,868
AUTOMATIC VISORS FOR AUTOMOTIVE VEHICLES OR THE LIKE
Filed Feb. 11, 1966

INVENTOR.
Arman K. Manookian, Jr.
BY
Leonard H. King
ATTORNEY

United States Patent Office 3,343,868
Patented Sept. 26, 1967

3,343,868
AUTOMATIC VISORS FOR AUTOMOTIVE
VEHICLES OR THE LIKE
Arman K. Manookian, Jr., 2875 Terrell Ave.,
Oceanside, N.Y. 11572
Filed Feb. 11, 1966, Ser. No. 526,819
11 Claims. (Cl. 296—97)

This invention relates generally to automotive vehicles and more particularly to automatically operated visors or light shields therefor.

Sun visors are generally placed above the windshield of an automobile so that a driver, at his own discretion, may lower the visor to protect himself from the sun's glare or the glare of oncoming headlights. It is the current practice to place these visors within the car in order to permit the driver to conveniently adjust them. To assist the driver, the prior art has many examples of automatic or semi-automatic visor actuating means. The prior art devices have fallen short of commercial acceptability because mounting means that are universally adaptable to all models of all cars have not been provided. Further, it has generally been necessary to remove the rear view mirror in order to accommodate the prior art devices.

The present invention overcomes the shortcomings of past devices in this field and in addition provides for the simple, side-by-side mounting of a pair of compact light shields or visors. The novel mounting plate used in combination with the new visors may readily be adapted to fit virtually every model of every car without interfering with or requiring the removal of the rear view mirror. The visors are slidably movable within guide rails secured to or integrally formed with the adapter plate and are actuated by a motor and a gear train. Either a photoelectric cell that is automatically responsive to external light conditions or a conveniently located snap action type switch may be used to energize the motor. If a switch is used it is preferred that it be operable by the driver's foot so that he need not take his hand off the steering wheel. The importance of either the photo cell or the switch to close the motor circuit is most evident when the car is making a turn into direct sunlight. Without this invention the driver must take one hand off the wheel to lower the conventional visor. A suitable decorative cover is added to the instant visors so that the drive mechanism therefor will not detract from the appearance of the car's interior and to additionally provide a padded safety feature.

Accordingly, it is an object of this invention to provide improved automatically operated visors for universal interior mounting in an automobile.

It is another object to provide automatic visors with an improved mounting plate that may be installed in a wide range of existing automobiles.

It is a further object to provide automatic visors for an automobile wherein the visors may be easily installed without interfering with or requiring the removal of the rear view mirror.

Yet another object is to provide a motor driven visor that is automatically actuated by means of a photo-electric cell through the electrical system of the car.

A further object is to provide a motor driven visor that is activated by means of a switch through the electrical system of the car.

Still another object of this invention is the provision of a decorative automatically actuated visor that includes padding for additional safety.

These and other objects, features and advantages of the invention will, in part, be pointed out with particularity and will, in part, become obvious from the following more detailed description of the invention, taken in conjunction with the accompanying drawing, which forms an integral part thereof.

In the various figures of the drawing like reference character designate like parts.

Figure 7:
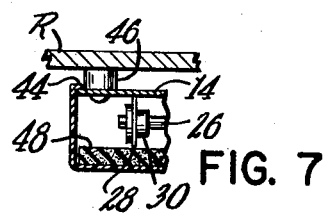
Figure 2:
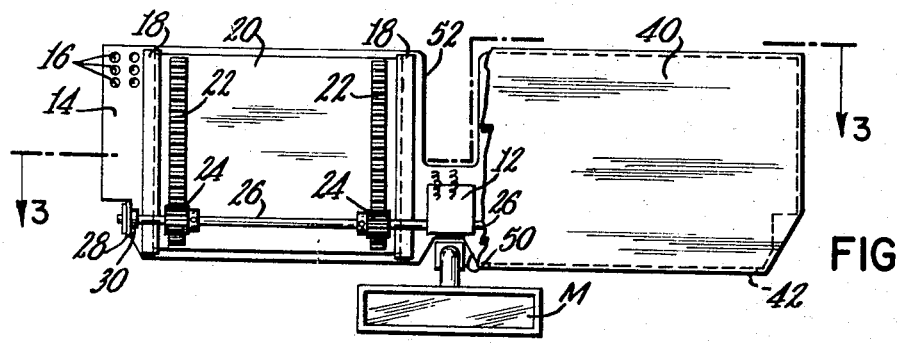
Figure 3:
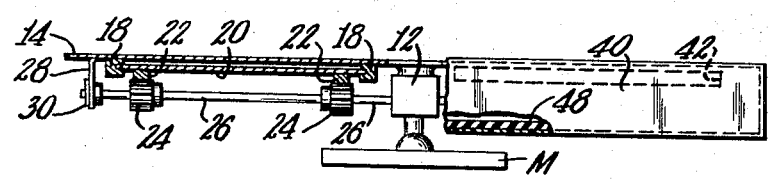
Figure 4:
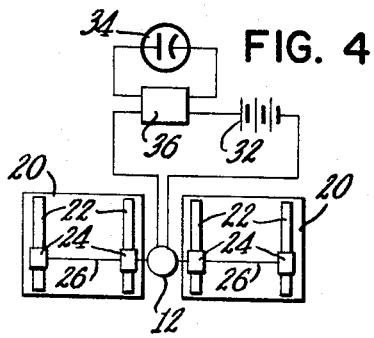
Figure 5:
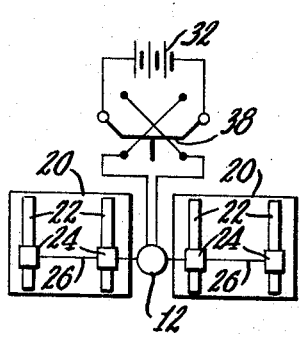
Figure 6:
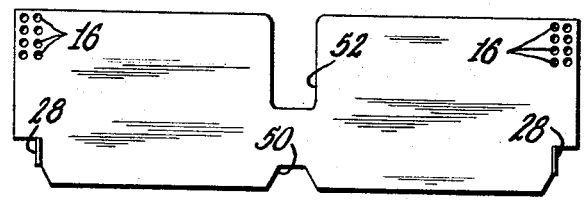

In the drawing:
FIG. 1 is a fragmentary sectional side elevational view of an automobile illustrating the installation and positioning of the present invention;
FIG. 2 is a front elevational view, partly in section of the visor and mounting means of the present invention. Only the location of the automobile rear view mirror is shown;
FIG. 3 is a plan view, partly in section, taken along line 3—3 of FIG. 2;
FIG. 4 is a schematic drawing showing one form of electrical connection for this invention;
FIG. 5 is another schematic drawing illustrating an alternative wiring diagram;
FIG. 6 is a plan view of the mounting bracket that forms a part of this invention; and
FIG. 7 is a fragmentary sectional end view illustrating the method of mounting the present invention.

Referring now to the drawing, in FIG. 1 an automobile A is shown having an automatic visor 10 installed therein. The visor is secured at the juncture of the roof and the windshield to the inside of the roof R of the automobile directly above the rear view mirror M. Reversible motor 12, which is used to actuate the visors, may also be seen in FIG. 1. The motor will be described in detail hereinafter.

FIG. 2 and FIG. 3 particularly illustrate the construction of the present invention. Backing plate 14 may be a stamped sheet metal member having a plurality of holes 16 formed proximate the ends thereof. These holes permit the mounting plate to be secured to the roof of the car utilizing the existing holes for the conventional sun visors supplied with the car. A sufficient number of holes are formed when the mounting plate is stamped out so so that the most convenient ones may be selected to register with the existing mounting holes in the automobile. It is also within the scope of this invention to enlarge the holes into slots disposed in different directions thus making the installation simpler by providing wider mounting tolerances.

Two pairs of slotted guide channels 18 are suitably secured to the face of the mounting plate in any conventional manner with each pair of opposed channels being arranged to slidably receive a flat, light-shielding member 20. As desired the shield member may be made either opaque or partially translucent with the aid of a light filtering medium. A pair of rack gears 22 are integrally secured to each shield member proximate and parallel to the guide channels.

A drive pinion 24 is arranged to meshingly engage each rack gear. The pinions are rigidly mounted on a common transverse shaft 26 that is journalled at its ends in bent tabs 28 formed during the stamping of the mounting plate. As may be seen in FIG. 2 and FIG. 3, motor 12 is centrally located and shaft 26 extends outwardly from two opposed sides of the motor. Suitable bearings 30 that do not require lubrication may be secured in the tabs to assure free rotation of the shaft on which the gears are mounted. Motor 12 supports the center of the shaft and by means of suitable internal right angle gear means, drives the shaft whereby the shields are simultaneously and reciprocally moved within the guide channels.

The motor is actuated by means of a source of power shown as the automobile battery 32 in FIG. 4 and FIG. 5. In the embodiment shown in FIG. 4 (and in FIG. 1 as well) a photo cell 34 and relay box 36 are used to close the circuit to the motor. The photo cell may conveniently be mounted on the dashboard of the automobile and directed to the forward end thereof. When the light conditions change and the shield is no longer required, relay 36 changes the motor polarity and the shields are retracted. FIG. 5 illustrates alternative circuit closing means. Switch 38, which is a reversing switch of the double pole, double throw type, is preferably located on the floor board so that the driver may deflect the switch with his foot and therefore need not take his hand off the wheel. As in the previous embodiment, the throwing of switch 38 in one direction energizes motor 12 whereby the visors may be moved within the guide channels to provide the required shielding action. Throwing of the switch in the opposite direction reverses the motor to retract the visors.

It is presently contemplated that the aforementioned components be concealed by a cover member 40 that serves the dual purpose of being decorative as well as providing a safety feature. Cover member 40 may conveniently be molded from polyethylene with suitable notches 42 (only one being shown) to permit the free passage of the shield members 20. The peripheral edge of the cover is downwardly and inwardly formed at 44 (FIG. 7) so that it may be snapped over the edge of the adapter plate. To facilitate assembly it is desirable if the adapter plate be slightly spaced from the roof of the car by spacer 46. Padding 48 provided on the inside of the cover affords a cushioning effect should the automobile stop suddenly and the occupants strike their heads against the visor. It should also be noted that the adapter plate (as well as the cover member) is suitably notched at 50 to clear the mounting for the rear view mirror. The adapter plate and the cover may also be cut away elsewhere, for example at 52, to minimize the appearance of bulk.

The apparatus described hereinabove is both easy and inexpensive to manufacture. It lends itself to installation as a do-it-yourself kit or may be factory installed by the manufacturer. The universal mounting plate facilitates installation in substantially all models of all automobiles. Of particular importance is the fact that the two-part visor construction does not interfere with the usage or the mounting of the rear view mirror. This is essential to the maintenance of current safety standards. Additional safety, as well as improved appearance, is achieved by the padded covers on the visors. It should also be noted that the present invention requires no more space than the existing or conventional sun visors.

Having thus disclosed the best embodiment of the invention presently contemplated, it is to be understood that various changes and modifications may be made by those skilled in the art without departing from the spirit of the invention.

What is claimed is:
1. An internal visor for use in a motor vehicle having an internal rear view mirror mounted at the forward end of the roof and an electrical power source, said visor comprising:
 (a) an adapter plate having front and rear surfaces, said plate being adapted for mounting to an inside surface of the body of the vehicle adjacent to the juncture of the vehicle roof and the vehicle windshield, said adapter plate in the assembled condition extending across substantially the full width of the vehicle and having a recess therein arranged to clear the mounting means for the rear view mirror of the vehicle;
 (b) two pairs of elongated channel members secured to the front surface of said adapter plate, each pair of channel members having opposing guide means, said channel members in each of said pair being parallel to and spaced from each other; said pairs of channel members being spaced from each other by said recess;
 (c) light-shielding means slidably disposed with respect to said guide means of each pair of said channel members;
 (d) motor means adapted to be energized by the electrical power source of the motor vehicle;
 (e) circuit control means connected in series between said motor means and the electrical power source of the motor vehicle; and
 (f) a gear train arranged to be driven by said motor and to displace said shielding means along said channel members when the electrical circuit is completed by said circuit closing means.

2. The apparatus in accordance with claim 1 wherein said adapter plate includes a plurality of mounting holes formed therethrough adjacent to the two side ends of said adapter plate.

3. The apparatus in accordance with claim 1 wherein said light-shielding means are opaque.

4. The apparatus in accordance with claim 1 wherein said light-shielding means are semi-translucent.

5. The apparatus in accordance with claim 1 wherein said gear train is comprised of a shaft rotatably driven by said motor means, at least one rack gear secured to each of said light-shielding means and a plurality of gears secured to said shaft, said gears being in meshing engagement with said racks.

6. The apparatus in accordance with claim 5 wherein said motor means is positioned intermediate said light shields and said shaft extends outwardly from two opposite sides of said motor means, said shaft extending across said light shields with the axis of said shaft perpendicular to the axis of said rack gears.

7. The apparatus in accordance with claim 1 wherein said circuit control means is a photo cell.

8. The apparatus in accordance with claim 1 wherein said circuit control means is a switch.

9. The apparatus in accordance with claim 1 wherein there is a further included a cover member enclosing said light-shielding means and at least a portion of said adapter plate.

10. The apparatus in accordance with claim 9 wherein the cover member includes a resilient padding member.

11. The apparatus in accordance with claim 1 wherein said guide means are slots formed in the opposed faces of said pairs of channel members, said slots extending substantially the full length of said channel members and being dimensioned to slidably receive the edges of said light-shielding means.

References Cited

UNITED STATES PATENTS

| 1,854,892 | 4/1932 | Ewend | 296—97.82 |
| 2,632,377 | 5/1953 | George | 296—97.82 |
| 3,226,151 | 12/1965 | Reuther | 296—97.88 |

BENJAMIN HERSH, *Primary Examiner.*

J. A. PEKAR, *Assistant Examiner.*